UNITED STATES PATENT OFFICE.

RAOUL PIERRE PICTET, OF WILMERSDORF, NEAR BERLIN, GERMANY.

PROCESS OF MAKING HYDROGEN.

1,134,416. Specification of Letters Patent. Patented Apr. 6, 1915.

No Drawing. Application filed May 29, 1911. Serial No. 630,177.

*To all whom it may concern:*

Be it known that I, RAOUL PIERRE PICTET, a citizen of the Swiss Republic, residing at Uhlandstrasse 116, Wilmersdorf, near Berlin, Germany, have invented certain new and useful Improvements in Processes of Making Hydrogen, and I do hereby declare the following to be a full, clear, and exact description of the invention.

The subject-matter of my invention is an improved process of making hydrogen.

At the present day large quantities of hydrogen are required as, for example, for airships, metallurgical operations and so on. It is well-known that when petroleum and coal-tar oils are heated they produce a soot-like smoke and very complicated, gaseous products both of the paraffin series, such as methane, ethane, propane, and of the olefin series, such as ethylene and so on.

Now a primary object of this invention is to provide a process of making from the crude petroleum of commerce, lubricating oils, solar oils, paraffin oils or gasolene, gases suitable in each instance to their purpose of employment.

As compared with known modes of manufacture, my process has the great advantage that it is cheap and can be readily carried into practice. My process substantially consists in liquid petroleum, for example, being vaporized alone or mixed with water, a suitable quantity of oxygen being added, if preferred, to the mixture of hydrocarbon and steam. The petroleum may, of course, be vaporized by itself and the steam, possibly mixed with oxygen, be supplied to the pipe in which decomposition of the introduced materials is to take place, or the desired gases or mixtures of gases are to be formed. Further, the petroleum may be vaporized alone and the water alone and united shortly before the pipe with the oxygen which is possibly to be supplied. Obviously, the present process can be varied in manifold ways in this direction.

The boiler or tank may be heated with any fuel, *e. g.* coal, gas and so on. The petroleum and the water or the petroleum alone is preferably boiled at atmospheric pressure. The vapors are conducted through a long, *e. g.* horizontal, iron pipe which is heated along its entire length to a temperature approximating the melting point of iron. This is essential. The length of the pipe will depend in each instance on the gas or gaseous mixture which it is wished to obtain. The temperature of the vapors in the pipe gradually rises until it reaches that of the pipe. The vapors pass hence into a water-cooled receiver and, if desired, the gaseous products can here be separated from the other products, in so far as provision has not been made, say, by supplying steam, or steam and oxygen, for possibly completely converting the solid constituents into gas or gaseous mixtures, and after having been filtered they pass into a gasometer.

My process may be carried into practice, for example, by supplying steam to the liquid petroleum at any suitable place; this will be done when it is wished to obtain hydrogen containing carbon monoxid. If, on the contrary, it is wished to obtain hydrogen free from carbon monoxid, petroleum alone or mixed with other hydrocarbons will be employed, or steam mixed with oxygen will be employed, this being done when it is wished to obtain complete conversion.

In order that the conditions to be observed in carrying my process into practice may be clearly understood, the following general particulars will serve.

In the event of only petroleum being employed without using water, the following can be observed: When petroleum vapors are gradually heated in the iron pipe from about 200° C. to about 1200° C., during the heating of the gases three modifications can be determined. This determination can be made by removing tests of gas from small holes drilled in the pipe. At first vapors having a brown color with the characteristic odor of the vapors produced from heavy oils is obtained; when these vapors are condensed in the test tubes they have a slight violet color. Secondly the brown color of the vapors changes to green; on condensation in test tubes a dark brown oil is obtained. Thirdly, when vapors are removed at the highest temperature at the end of the pipe, which is preferably an iron or steel pipe, it is found that they have become black and that after they have been condensed in the test tubes they deposit a dark, thick, black tar. When the density of the vapors removed from these three outlets is determined, it is found that the specific weight per liter of gas after filtration constantly diminishes corresponding to the rise in temperature of the gases. Toward the end of the pipe the gas has a specific weight 0.55 to 0.25 and a buoyancy 0.75 gr. to 1 gr. per liter (in caoutchouc balloon). When these three holes bored in the heated tube are placed closer together, it is found that the gases in the pipe at about 800° C. to 1200° C. consist of carbon and of pure methane in combination with a certain quantity of pure hydrogen. Up to a temperature of approximately over 1200° C. the quantity of pure hydrogen constantly increases, while the percentage of methane decreases and of carbon dust increases. On the other hand, it has been found that for each gram of methane to be dissociated at over 1200° to 1350° C., 18.1 calories must be supplied through the walls of the pipe, e. g. an iron pipe, to the gas. This quantity of heat should be supplied to the gas through a pipe wall which is itself heated to near the melting point of iron, that is to say not over 1350° C., because otherwise the iron or steel would melt.

As the difference in temperature between the gas and the wall of the pipe through which the gases flow is very small at this characteristic place, it is clear that the large quantities of heat which would have to be supplied in order to compensate for the loss arising owing to the dissociation of the methane into its constituent elements require very large areas which apparently would not be in the correct proportion to the surface of the pipe whose influence at the start has been considerable, because the gases circulating in the pipe were still at a low temperature. This experimental confirmation forms the foundation of the present process, for it is seen that the construction of the apparatus must meet very special, essential conditions.

Petroleum or any liquid hydrocarbon of exothermic constitution is employed, and consequently not acetylene. The petroleum is vaporized and the vapors are led into a heated pipe, whereby a series of chemical modifications of these vapors are produced, until they have been reduced to the mixture of three bodies or classes of bodies, namely methane, various vapors of coal-tar oils, and soot. The temperature then approximates to 1200° to 1350° C.; at this place the surface of the heated pipe must have a sufficient extent in order that 18.1 calories per 16 grams of gas can be supplied to the gases passing through the pipes at this high temperature. The temperature of the pipe may not attain 1350° C., i. e. it must remain below the melting point of iron. This condition, which is difficult to fulfil in practice, has rendered the known distillation process for hydrocarbon difficult.

Of course it is possible to carry my process into practice in many various ways. The soot produced can be removed continuously or intermittently.

For the case when petroleum is vaporized at the same time as water the following details will serve: In the above described example 1 kg. petroleum results in about 700 g. soot, about 200 g. pure hydrogen and about 100 g. of heavy vapors of hydrocarbons which are not decomposed at the temperature near the melting point of iron. 700 g. carbon heated with 933 g. pure oxyen produce, as is well-known, pure carbon monoxid. Now when 1050 g. water are decomposed 933 g. oxygen and 117 g. hydrogen are produced, as is known. In order to obtain complete decomposition 68.36 calories must be supplied to each molecule of water. Each molecule of carbon monoxid supplies, however, during its formation 29 calories. Now for converting 933 g. oxygen into 1603 g. carbon monoxid 2294 calories must be supplied through the wall of the iron pipe, it being understood that these numbers hold good when 1 kg. petroleum and 1050 g. water are to be vaporized. This quantity of heat, namely 2294 calories for the present example, must be supplied to the wall of the iron pipe besides the quantity of heat requisite for converting petroleum vapors into carbon and methane, or methane into carbon and hydrogen.

The pipe which is employed, e. g. an iron pipe, must of course be lengthened correspondingly, i. e. in proportion to the increase of the additional quantity of heat supplied. If it were wished to supply the quantity of heat (2294 calories) to the wall of the pipe by providing a more intense furnace, the aim in view could not be attained because the pipe would be melted. Consequently, the present process can be suitably carried into practice only by provision being made, as mentioned above, for the pipe in which the hydrogen and carbon monoxid are converted being suitably lengthened.

In the described apparatus a maximum of 2220 liters of pure hydrogen and 700 g. soot which is moistened say with 100 g. non-decomposed fatty oil can be obtained.

My process is carried into practice, for example, as follows:—1 kg. petroleum and 1050 g. water are allowed to flow simultaneously into a boiler. These two substances are then vaporized and passed into a preferably iron pipe heated almost to the melting point of iron. The following maximum quantities of substances will be obtained: By the decomposition of the methane 2220 l. pure hydrogen, by the decomposition of the steam 1300 l. pure hydrogen, by the combustion of 700 g. carbon, 1633 g. carbon monoxid and a residue of 100 g. non-decomposed coal-tar oils. These 1633 g. carbon monoxid occupy a volume of 1307 l. The total volume of the gaseous mixture finally obtained consisting of hydrogen and carbon monoxid and resulting from 1 kg. petroleum will be 4827 l., composed of 3520 l. hydrogen and 1307 carbon monoxid calculated at 0° C. and 760 m/m. The buoyancy of this mixture of gases is 0.887 g. per liter and the specific weight 0.406. The heat of combustion of this mixture of gases is 3022 calories per cubic meter.

The mixture of gases produced can be advantageously used for autogenous welding because this carbonaceous gas has a highly reducing action on account of its percentage of carbon acting *in statu nascendi*.

An important advantage of my process consists in its being possible, by regulating the supply of water, to decompose any desired quantity of carbon which settles in the condenser.

The conversion of the soot which is formed into carbon monoxid will of course be more or less complete according in each instance to the quantity of water supplied. The more rich the final gas is in carbon monoxid, the more soot must enter into the reaction.

For more clearly explaining this form of my invention the following details will serve: The gaseous mixture produced by the simultaneous distillation of hydrocarbon vapors and steam, and specially adapted for use for industrial purposes, as *e. g.* for autogenous welding and the like and as a substitute for benzin, spirit and the like, has a calorific capacity of combustion of about 3000 calories per cb. m. Now it has been found that complete conversion at the temperature near the melting point of iron does not take place because, on the one hand, the temperature of decomposition of the steam (under the influence of the finely divided carbon) is higher than that of the hydrocarbons and, on the other hand, a deficit of 30 calories is obtained owing to the quantity of heat absorbed by each molecule of water for each 18 g. water which entered in the form of steam into the pipe. If, on the contrary, it is wished to obtain complete conversion, steam mixed with oxygen will preferably be supplied to the hydrocarbon vapors. Now it has been observed that at about 1300° C. 20–25% of the supplied water is converted into gas and mixes with the pure hydrogen. If the temperature approaches 1400° or 1500° C. the relation increases twofold or threefold, *i. e.* almost complete conversion of the water is obtained. The hydrocarbon vapors are supplied with steam mixed with any desired quantity of oxygen, and the mixture of steam and oxygen should be supplied near the point at which the hydrocarbons enter. The mixture of steam and oxygen should be as regulatable as possible.

The following now takes place: Each molecule of oxygen charged with steam meets in the heated pipe with hydrocarbon molecules which are already decomposed and have formed carbon *in statu nascendi*. This very hot carbon *in statu nascendi* is now able to convert the steam and oxygen when the necessary quantity of heat for this process of decomposition is supplied to the same at this place at the moment when the carbon *in statu nascendi* is produced. As the carbon is present in excess at this part of the pipe filled with hydrocarbon vapors, heat is developed, the oxygen from the steam and the oxygen which is supplied from carbon monoxid, each molecule of which supplies 29 calories. When a suitable quantity of oxygen is supplied to the steam, all the carbon can be bound which has been formed by the decomposition of the hydrocarbon without having to change the temperature of the chamber in the pipe. The quantity of heat consumed by the decomposition of the water is momentarily covered by the quantity of heat produced in the formation of the carbon monoxid which is added to the generated hydrogen.

Owing to a certain quantity of oxygen mixed with steam being brought in, the heat of decomposition of the hydrocarbon and of the hydrogen can be completely covered. To bring about this double covering, it suffices exactly to regulate the ratio of the hydrocarbon vapors continuously flowing through the pipe to the mixture of steam and oxygen.

When carrying my process into practice the pipe is heated to a temperature at which the hydrocarbon vapors are decomposed. From this temperature downward (about 1350° C.) the fire surrounding the pipe has merely the purpose of raising the temperature of the vapors flowing into the pipe at their normal temperature to 1350° C. It is not necessary to supply fresh quantities of heat to the wall of the heated pipe. As all chemical reactions taking place in the pipe mutually bring about a state of thermic equilibrium, the external temperature of the wall of the pipe will be lower than was previously the case as long as the absorbed heat is substituted by exterior heating. Consequently, the pipe is no longer exposed to being melted by the heat. Thus a complete reaction with material shortening of the pipe can be obtained which is important for certain purposes. The gas which is obtained is a mixture of hydrogen and carbon monoxid without any material admixture of nitrogen or carbonic acid, traces of which only are present. It has not heretofore been possible to make this gaseous mixture by a continuous process.

It is to be understood that the oxygen used for the described process may be made according to any process, but oxygen made from the distillation of liquefied air is particularly suitable for the present purpose.

I claim:

1. The method of producing pure hydrogen from exothermic hydrocarbons such as described, which comprises passing a current of hydrocarbon vapor continuously through a conduit and heating said conduit to temperatures increasing from the entrance of said conduit to a temperature sufficient to dissociate the hydrocarbon into carbon and pure hydrogen and collecting the hydrogen.

2. The method of producing pure hydrogen from exothermic hydrocarbons such as described, which comprises supplying to one end of a conduit a continuous current of hydrocarbon vapor while heating the conduit to near the melting point of iron, thereby dissociating the hydrocarbon into pure hydrogen and carbon, and discharging the pure hydrogen in a continuous current from the other end of the conduit.

3. The method of producing pure hydrogen from exothermic hydrocarbons such as described, which comprises passing a continuous current of hydrocarbon vapor through a conduit heated from about 1200° C. to 1350° C. and supplying through the walls of the conduit 181 calories of heat to every 16 grams of gas, thereby dissociating the hydrocarbon into carbon and hydrogen, and discharging the hydrogen continuously from said conduit.

In testimony whereof I have signed my name to this specification, in the presence of two subscribing witnesses.

RAOUL PIERRE PICTET.

Witnesses:
A. HENRI LINN,
R. WESTACOTT.